United States Patent
Kim et al.

(10) Patent No.: US 7,927,735 B2
(45) Date of Patent: Apr. 19, 2011

(54) SECONDARY BATTERY

(75) Inventors: Heongsin Kim, Yongin-si (KR); Sangjoo Lee, Yongin-si (KR); Youngho Kim, Yongin-si (KR); Nohyun Kwag, Yongin-si (KR)

(73) Assignee: Samsung SDI Co., Ltd., Gongse-dong, Giheung-gu, Yongin-si, Gyeonggi-do (KR)

( * ) Notice: Subject to any disclaimer, the term of this patent is extended or adjusted under 35 U.S.C. 154(b) by 134 days.

(21) Appl. No.: 12/232,813

(22) Filed: Sep. 24, 2008

(65) Prior Publication Data

US 2009/0087693 A1 Apr. 2, 2009

(30) Foreign Application Priority Data

Sep. 28, 2007 (KR) .................. 10-2007-0097984

(51) Int. Cl.
*H01M 10/02* (2006.01)
*H01M 10/46* (2006.01)
*H01M 2/02* (2006.01)

(52) U.S. Cl. ........ 429/175; 429/176; 429/178; 429/185

(58) Field of Classification Search .................. 429/162, 429/175, 176, 178, 185
See application file for complete search history.

(56) References Cited

U.S. PATENT DOCUMENTS

| 6,205,034 | B1 | 3/2001 | Zayatz |
| 6,524,732 | B1 | 2/2003 | Iwaizono et al. |
| 6,979,502 | B1 | 12/2005 | Gartstein et al. |
| 2005/0112456 | A1* | 5/2005 | Kozu et al. ............... 429/62 |
| 2005/0122667 | A1 | 6/2005 | Moon |
| 2005/0208345 | A1 | 9/2005 | Yoon et al. |
| 2006/0055500 | A1 | 3/2006 | Burke et al. |
| 2006/0257731 | A1 | 11/2006 | Yoon |
| 2007/0026296 | A1 | 2/2007 | Byunn et al. |

FOREIGN PATENT DOCUMENTS

| EP | 1804328 A1 * | 7/2007 |
| JP | 10-064576 A | 3/1998 |
| JP | 2001196048 A * | 7/2001 |
| JP | 2006-012589 | 1/2006 |

* cited by examiner

*Primary Examiner* — Gregg Cantelmo
(74) *Attorney, Agent, or Firm* — Robert E. Bushnell, Esq.

(57) ABSTRACT

A secondary battery having a porous filling member that occupies a portion of a molding space between a bare cell and a protective circuit board. The presence of the filling member makes it possible to uniformly apply a molding resin into the molding space and to reduce defects due to thickness irregularity of a mold or a surface defect thereof. The secondary battery includes a bare cell, a protective circuit module including a protective circuit arranged on a protective circuit board and a plurality of electrical connection members electrically connecting the protective circuit board to the bare cell, a filling member arranged between the bare cell and the protective circuit board and a mold covering the electrical connection members and the filling member.

19 Claims, 5 Drawing Sheets

SECONDARY BATTERY

CLAIM OF PRIORITY

This application makes reference to, incorporates the same herein, and claims all benefits accruing under 35 U.S.C. §119 from an application earlier filed in the Korean Intellectual Property Office on 28 Sep. 2007 and there duly assigned Serial No. 10-2007-0097984.

BACKGROUND OF THE INVENTION

1. Field of the Invention

The present invention relates to a secondary battery in which a porous filling member occupies a portion of the molding space between a bare cell and a protective circuit board prior to a molding operation.

2. Description of the Related Art

In general, unlike primary batteries that are not rechargeable, secondary batteries are rechargeable batteries. Secondary batteries have come into widespread use for small electronic apparatuses, such as cellular phones, personal digital assistants (PDAs), and notebook computers. In particular, lithium secondary batteries operate at a voltage of 3.6 V and are widely used as a power source for electronic apparatuses since the operating voltage of the lithium secondary battery is approximately 3 times higher than that of nickel-cadmium (Ni—Cd) batteries or nickel-hydride (Ni-MH) batteries and the lithium secondary batteries have a high energy density per unit weight.

In general, the lithium secondary battery employs a lithium-based oxide as a positive electrode active material and a carbon material as a negative electrode active material. In addition, the lithium secondary battery can take on various shapes, such as a cylindrical shape, a square shape and a pouch shape.

The square shape secondary battery includes a square-shaped bare cell and a protective circuit module. The bare cell includes a jellyroll-type electrode assembly, a can that has an opening portion on one side and houses the electrode assembly, and a cap assembly that closes up the opening portion of the can to seal the can.

The protecting circuit module is a safety device for cutting off a circuit to break a current when the voltage of the battery is suddenly increased due to overheating or overdischarging of the battery, thereby preventing the combustion or explosion of the battery. The protective circuit module includes a protective circuit board formed by mounting various elements on a printed circuit board (PCB), and the protective circuit board is electrically connected to the bare cell through conductors, which are called lead plates.

A combination of the bare cell and the protective circuit module is called a core pack, and the secondary battery can be used in the form of the core pack. However, in general, a separate outer case is used to insulate or protect the core pack since the secondary battery is used for portable electronic apparatuses. For example, generally, the core pack is put into an outer case formed of a synthetic resin, or the bare cell and the protective circuit module of the core pack are combined to each other by molding, and labeling or tubing is performed on the combination.

However, when the bare cell and the protective circuit module of the core pack are combined to each other by molding, a molding space is increased, and it is difficult to uniformly inject a molding resin into the large molding space. Therefore, the molding resin is injected into the molding space of the core pack to a non-uniform thickness, which causes the surface of a mold that is located at the upper part of the secondary battery to be uneven, or causes the thickness of the mold of the secondary battery to be non-uniform, resulting in a large defect distribution in the battery. In addition, the molding resin injected into the molding space between the bare cell and the protective circuit module suddenly solidifies and shrinks a little. In this case, as described above, when the molding resin is injected non-uniformly, or when the molding resin is not completely injected into the molding space due to electrical connection members or elements, the amount of shrinkage of the molding resin increases. As a result, the mold of the secondary battery has a non-uniform surface, and a manufactured secondary battery has a non-uniform thickness, which results in a large defect distribution in the secondary battery.

In particular, as the functions of portable electronic apparatuses increase, high-capacity batteries are in demand, and in order to meet these demands, the width or thickness of the battery increases, which results in a large molding space for the core pack. Therefore, as described above, it is difficult to uniformly inject a molding resin into the molding space of the core pack, which causes the degree of distribution of a mold formed at an upper part of the core pack of the secondary battery to increase.

Further, since electrical connection members or elements, such as lead plates, are provided between the bare cell and the protective circuit board, the initial arrangement of the connection members or elements is upset due to the application pressure of the molding resin. Therefore, when a high application pressure of the molding resin is applied to the protective circuit board or the lead plates, the arrangement of the bare cell and the protective circuit module is upset, which results in an increase in the defective rate in secondary batteries.

SUMMARY OF THE INVENTION

Accordingly, the present invention has been contrived to solve the above-described drawbacks, and an aspect of the present invention is to provide a secondary battery capable of improving workability to uniformly apply a molding resin into a molding space and reducing the defect rate in a secondary battery caused by the non-uniform thickness of a mold or defects in the surface thereof by inserting a porous filling member into a portion of the molding space between the bare cell and the protective circuit board before molding.

Another aspect of the present invention is to prevent the abnormal application of a molding resin due to electrical connection members and thus to minimally reduce defects in a mold by providing a frame-shaped porous filling member between a bare cell and a protective circuit board so as to surround the electrical connection members and lead plates.

Still another aspect of the present invention is to protect electrical connection members, such as lead plates provided between a bare cell and a protective circuit board, from the application pressure of a molding resin, thereby maintaining the initial arrangement of the protective circuit board after molding.

According to an aspect of the invention, there is provided a secondary battery that includes a bare cell, a protective circuit module including a protective circuit arranged on a protective circuit board and a plurality of electrical connection members electrically connecting the protective circuit board to the bare cell, a filling member arranged between the bare cell and the protective circuit board and a mold covering the electrical connection members and the filling member. The filling member can include a porous material. The porous material can be polyurethane.

The bare cell can have a square shape that includes four narrow sides continuously connected to one another and two wide surfaces connected to the four narrow sides, the filling member can be coupled to a one of the four narrow sides of the bare cell on which the protective circuit module and an electrode terminal of the bare cell are arranged. The filling member can have a frame shape, and the electrical connection members of the protective circuit module can be arranged within the frame. The electrical connection members can be prevented from being moved by having at least one of the plurality of electrical connection members being in contact with an inner surface of the filling member. The frame-shaped filling member can include a main frame that surrounds the electrical connection members and a rib that is arranged inside the main frame and occupies a space between ones of the plurality of electrical connection members. The main frame can have a closed shape. The main frame can include two long sides parallel to each other and a short side that connects ends of the two long sides. The secondary battery can also include an adhesive layer arranged on an inner surface of the frame-shaped filling member.

The plurality of electrical connection members of the protective circuit module can include a first lead plate electrically connected to an electrode terminal of the bare cell while being electrically insulated from a side of the bare cell on which the electrode terminal is arranged, a second lead plate electrically connected to a surface of the bare cell that has an opposite polarity to that of the electrode terminal by being arranged on a side of the bare cell on which the electrode terminal is arranged and at a position opposite to the first lead plate, a first connection terminal connected to the first lead plate by being arranged on the protective circuit board and a second connection terminal connected to the second lead plate by being arranged on the protective circuit board.

The first lead plate can include a first conductor and a second conductor, the first conductor can be electrically connected to the electrode terminal of the bare cell, the first and second conductors can be electrically connected to each other, the secondary battery can also include a positive temperature coefficient (PTC) element arranged between the first conductor and the second conductor. The bare cell can include a pouch and positive and negative electrode tabs of an electrode assembly arranged within the pouch and extending from the pouch, the protective circuit board can be connected to ends of the positive and negative electrode tabs extending from the pouch, the filling member can be arranged in a space between one surface of the protective circuit board and the pouch. The filling member can have a plate shape and has an area equal to or smaller than an area of a cross section of the bare cell taken along a thickness direction.

The pouch can include an upper pouch film and a lower pouch film, surfaces of the upper and lower pouch films opposite to each other including heat adhesive layers, edges of the upper and lower pouch films being sealed by the heat adhesive layers, wherein a sealing region that is arranged in a direction in which the electrode tabs extend forms a terrace, the terrace not being bent in the thickness direction of the bare cell, the filling member can be arranged inside the terrace. The protective circuit board can be arranged inside the terrace, the filling member can be arranged between both ends of the protective circuit board and an inner surface of the terrace. The filling member can be a plate having both ends in contact with inner surfaces of the terrace. Each of the upper and lower pouch films can include a polyolefin heat adhesive layer including a sealing material, an aluminum layer to maintain a mechanical strength of the pouch and to prevent permeation of water and oxygen and a protective nylon layer.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicated the same or similar components, wherein.

DETAILED DESCRIPTION OF THE INVENTION

Figure 1:
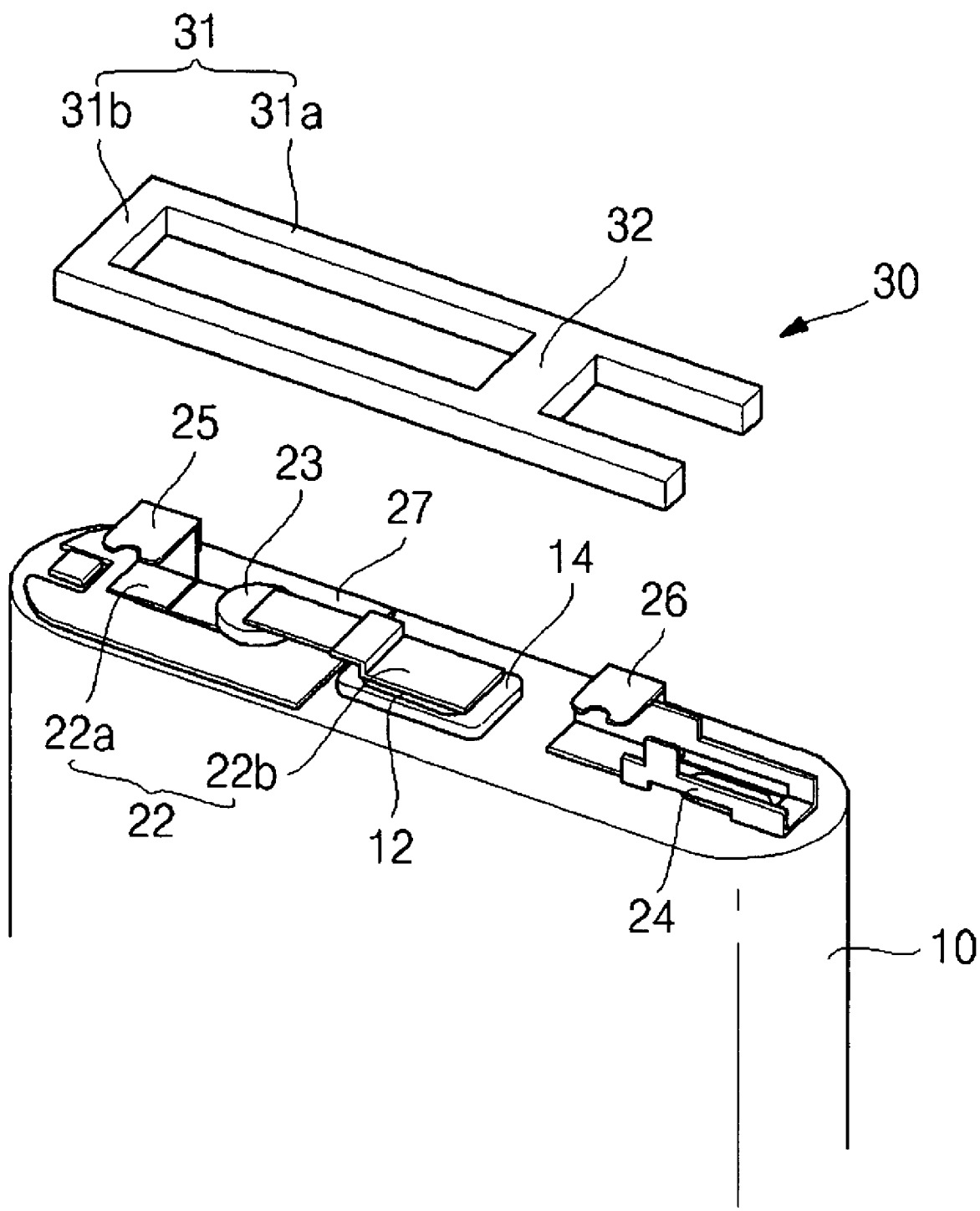
FIG. 1 is an exploded perspective view illustrating a secondary battery according to an exemplary embodiment of the invention before a filling member is coupled to a can-type bare cell.
Figure 2:
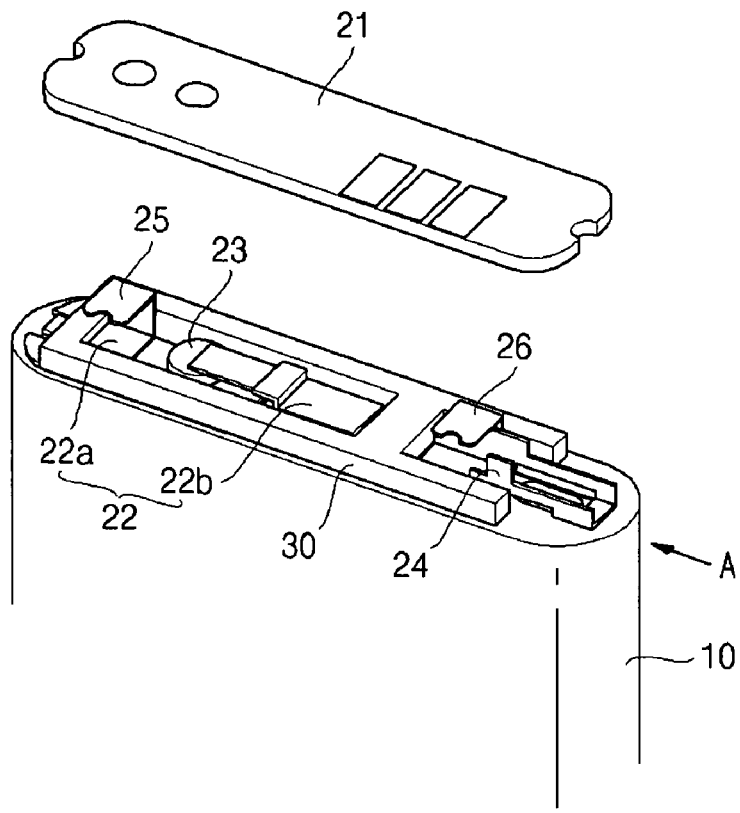
FIG. 2 is a perspective view illustrating the bare cell and the filling member coupled to the bare cell of FIG. 1.
Figure 3:
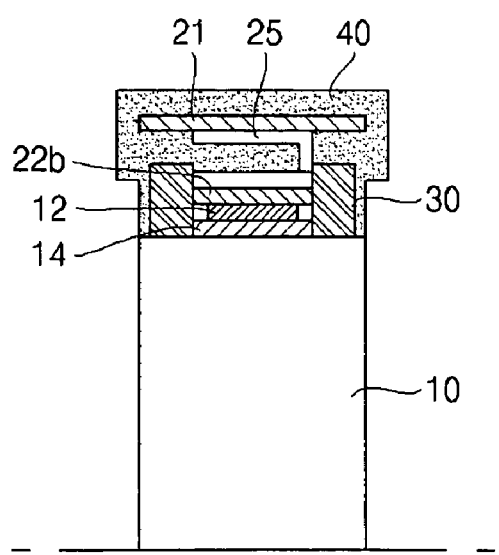
FIG. 3 is a plan view of FIG. 2.
Figure 4:
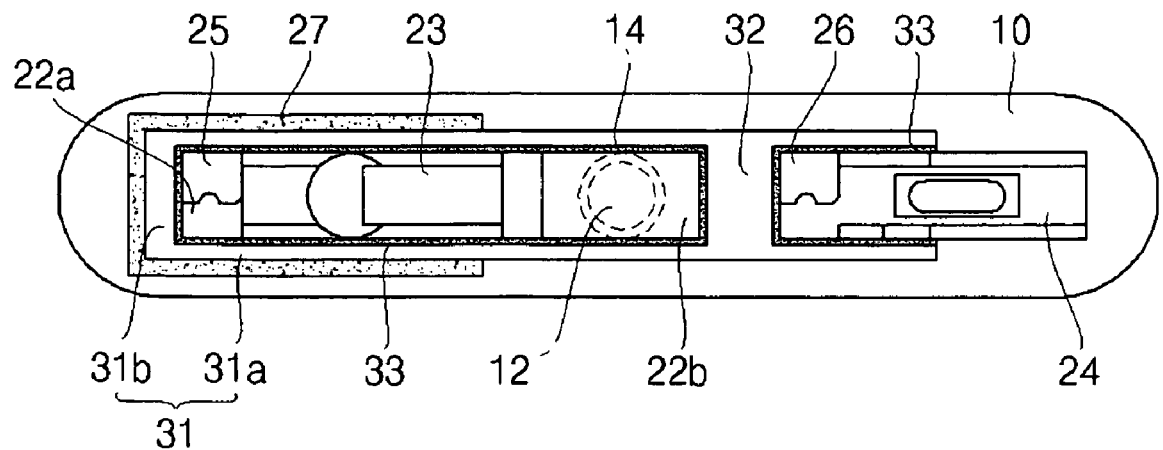
FIG. 4 is a cross-sectional view illustrating the secondary battery shown in FIGS. 1 to 3 after molding.

Turning now to FIGS. 1 to 4, FIG. 1 is an exploded perspective view illustrating a secondary battery according to an exemplary embodiment of the invention before a filling member is coupled to a can-type bare cell, FIG. 2 is a perspective view illustrating the bare cell and the filling member coupled to the bare cell of FIG. 1, FIG. 3 is a plan view of FIG. 2 and FIG. 4 is a cross-sectional view illustrating the secondary battery shown in FIGS. 1 to 3 after molding.

As shown in FIGS. 1 to 4, the secondary battery according to the exemplary embodiment of the invention includes a bare cell 10, a protective circuit module, a filling member 30, and a mold 40. The bare cell 10 is chargeable and dischargeable, and in this exemplary embodiment, a square-type bare cell is used as an example. That is, the bare cell 10 has a square shape having four narrow sides that are continuously connected to one another and two wide surfaces connected to the four narrow sides. The square-type bare cell 10 has a shape that is widely used for a general secondary battery. Therefore, a detailed description of the square-type bare cell 10 is omitted, but the square-type bare cell 10 will be briefly described below.

The bare cell 10 includes a jellyroll-type electrode assembly that is chargeable or dischargeable, a can that has an opening at one side to house the electrode assembly, and a cap assembly for closing up the opening in the can. The cap assembly includes a cap plate that closes up the opening in the can, and an electrode terminal is provided on the cap plate so as to be insulated from the cap plate. One of the positive and negative electrode tabs provided in the electrode assembly is connected to the electrode terminal, and the other electrode tab is connected to the cap plate, so that the cap plate and the can serve as one electrode terminal.

The protective circuit module includes a protective circuit board 21 having a protective circuit for the bare cell 10 formed thereon, first and second lead plates 22 and 24 that can electrically connect positive and negative electrodes of the bare cell 10 to the protective circuit board 21, and a PTC (positive temperature coefficient) element 23 serving as a safety element. In this exemplary embodiment, components for electrically connecting the protective circuit board 21 to the bare cell 10, such as the first and second lead plates 22 and 24 and the PTC element 23, are referred to as electrical connection members.

The protective circuit board 21 generally includes a PCB having a circuit pattern formed thereon and electronic elements mounted on the PCB. One end of the first lead plate 22 is connected to an electrode terminal 12 of the bare cell 10 and the other end of the first lead plate is connected to the first connection terminal 25 of the protective circuit board 21. The first lead plate 22 is coupled to one side of the bare cell 10 having the electrode terminal 12 provided thereon, with an insulating sheet 27 interposed between the first lead plate 22 and the bare cell 10. In addition, the second lead plate 24 is coupled to the one side of the bare cell 10 having the electrode terminal 12 provided thereon at a position opposite to the first lead plate 22. The second lead plate 24 is connected to a second connection terminal 26 of the protective circuit board 21, so that the protective circuit board 21 is electrically connected to an electrode having a polarity that is opposite to that of the electrode terminal 12 of the bare cell 10. As described above, generally, the electrode terminal 12 serves as a negative terminal, and the can and the cap plate forming an outer case of the bare cell 10 serves as a positive terminal. The electrode terminal 12 is coupled to one side of the bare cell 10 so as to be insulated therefrom by an insulating gasket 14.

The first lead plate 22 is composed of a first conductor 22a and a second conductor 22b. The second conductor 22b is electrically connected to the electrode terminal 12 of the bare cell 10, and the first conductor 22a is electrically connected to the protective circuit board 21 by the first connection terminal 25. Preferably, the PTC element 23 is disposed between the first conductor 22a and the second conductor 22b to electrically connect the first and second conductors 22a and 22b. The PTC element serves as a conductor at room temperature. When ambient temperature increases, the electric resistance of the PTC element increases in proportion to the increase in temperature, and the PTC element serves as a nonconductor. When the increased temperature decreases to the original temperature, the PTC element serves as a conductor. In this way, the PTC element breaks a battery circuit when overheating occurs in the battery due to an overcharge or a short circuit.

The filling member 30 occupies a portion of the gap between the bare cell 10 and the protective circuit board 21 so that most of the molding space between the bare cell 10 and the protective circuit board 21 is occupied by the filling member 30. In order words, the molding space between the bare cell 10 and the protective circuit board 21 is considerably reduced by the presence of the filling member 30, which results in a reduction in the amount of molding resin required for molding the secondary battery. Therefore, a relatively small amount of resin is applied into the reduced molding space between the bare cell 10 and the protective circuit board 21, and thus a molding resin is more likely to be uniformly applied into the molding space, which makes it possible to reduce defects in the secondary battery caused by the mold 40 not having uniform thickness and shrinkage which can occur when the molding resin is solidified. As a result, the mold 40 having a flat and smooth surface can be formed.

Preferably, the filling member 30 is made out of a porous material such as polyurethane. When the filling member 30 is made out of a porous material, the filling member 30 can absorb the molding resin applied from a circumferential portion of the filling member 30, and heterogeneity between the filling member 30 and the mold 40 formed of the molding resin is reduced, which makes it possible for the filling member 30 to be strongly integrated to the mold 40.

In addition, the filling member 30 should be securely fixedly in the space between the bare cell 10 and the protective circuit board 21. Therefore, it is preferable that the filling member 30 be fixed to one side of the bare cell 10 because it is easier to fix the filling member 30 to the bare cell 10 than to the protective circuit board 21. Considering the performance of the filling member 30 occupying a portion of the space between the bare cell 10 and the protective circuit board 21, the electrode terminal 12 of the bare cell 10 is provided on the one side of the bare cell 10 to which the filling member 30 is fixed.

The filling member 30 can be formed in a frame shape, and electrical connection members for the protective circuit module can be provided inside the frame. That is, the filling member 30 surrounds the electrical connection members for the protective circuit module, so that when the molding resin is applied to the space between the bare cell 10 and the protective circuit board 21, the filling member 30 protects the electrical connection members of the protective circuit module from the application pressure of the molding resin. In other words, the application pressure of the molding resin that is applied to the first and second lead plates 22 and 24 serving as the electrical connection members and to the protective circuit board 21 connected to the bare cell 10 by the first and second lead plates 22 and 24 is considerably lowered when the filling member 30 is present. As a result, the protective circuit board 21 of the protective circuit module and the electrical connection members are less likely to be deformed from their initial states during the molding process of the battery, and thus defects in the appearance of the battery are reduced after molding. In addition, the stability of the electrical connection between the bare cell 10 and the protective circuit board 21 after molding is improved.

The filling member 30 having a frame shape can include a main frame 31 that surrounds the electrical connection members of the protective circuit module and a rib 32 that is provided inside the main frame 31 to connect the main frame 31. As shown in FIGS. 1 to 4, the main frame 31 of the filling member 30 includes a pair of long sides 31a that are parallel to each other and a short side 31b that connects ends of the two long sides 31a. The rib 32 is provided between the two long sides 31a so as to occupy a gap between the electrode terminal 12 of the bare cell 10 and the second lead plate 24, which is one of the electrical connection members for the protective circuit module. In this exemplary embodiment, one rib 32 is provided between the two long sides 31a, but the invention is not limited thereto. For example, two or more ribs can instead be present if necessary. Preferably, the filling member 30 is made to a sufficient size for the inner surface thereof to come into contact with a portion of or the entire surface of each of the electrical connection members for the protective circuit module, so that the filling member 30 can support the electrical connection members for the protective circuit module.

Referring to FIG. 3, three circumferential surfaces of the second lead plate 24 come into contact with the two long sides 31a and the one rib 32 of the filling member 30. Three circumferential surfaces of each of the first and second conductors 22a and 22b of the first lead plate 22 come into contact with the two long sides 31a, the one short side 31b, and the one rib 32 of the filling member 30. The entire circumferential surface of the first lead plate 22, which is a combination of the first conductor 22a and the second conductor 22b, comes into contact with the inner surface of the filling member 30. Therefore, most of the circumferential surfaces of the first and second lead plates 22 and 24 come into contact with the inner surface of the filling member 30, so that the first and second lead plates 22 and 24 are supported by the filling member. By doing so, the first and second lead plates 22 and 24 can withstand external pressure or the pressure of the molding resin applied during molding. As a result, deformation of the first and second lead plates 22 and 24 can be prevented.

An adhesive layer 33 can be included on the inner surface of the filling member 30 so as to firmly fix the electrical connection members of the protective circuit module to the inner surface of the filling member 30. As shown in FIG. 3, the adhesive layer 33 is formed on the inner surface of the filling member 30 and the circumferential surfaces of the electrical connection members, so that the first and second lead plates 22 and 24 are adhered to the inner surface of the filling member 30. As a result, the first and second lead plates 22 and 24 are firmly supported by the filling member 30.

Figure 5:
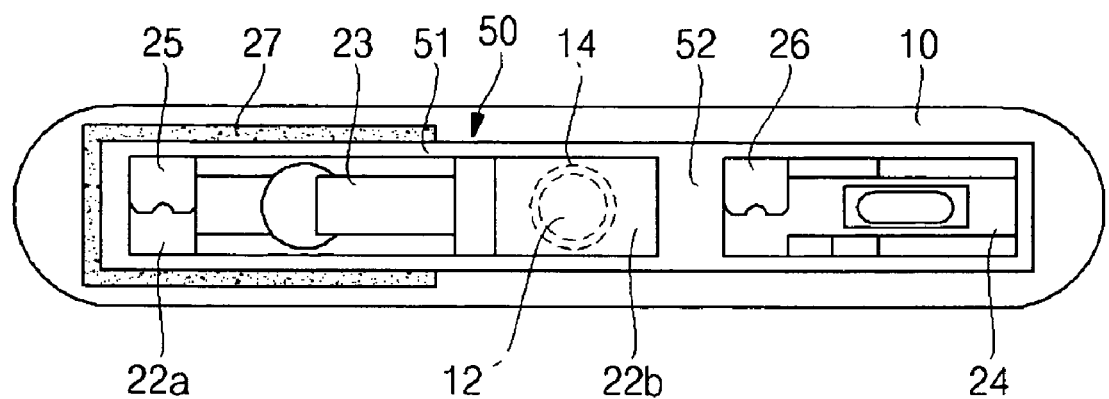
FIG. 5 is a plan view illustrating a can-type bare cell and a filling member coupled thereto according to another exemplary embodiment of the invention.

Turning now to FIG. 5, FIG. 5 shows another example of the filling member 50. As shown in FIG. 5, a filling member 50 includes a main frame 51 having a closed rectangular shape in plan view and one rib 52 formed inside the main frame 51. The rib 52 occupies a gap between the electrode terminal 12 and the second lead plate 24 of the protective circuit module. In this exemplary embodiment, one rib 52 is formed inside the main frame 51 having a closed rectangular shape, but the invention is not limited thereto. The shape of the main frame or the number of ribs can be varied and still be within the scope of the present invention. For example, the main frame can be formed such that two sides arranged in a width direction of the bare cell have round shapes.

In this case, similar to the filling member 30 according to the exemplary embodiment shown in FIGS. 1 to 4, the filling member 50 is preferably formed to a sufficient size for the inner surface thereof to come into contact with some or all of the electrical connection members of the protective circuit module. That is, as can be seen from FIG. 5, the circumferential surfaces of the PTC element 23 and the first and second lead plates 22 and 24 of the protective circuit module come into contact with the main frame 51 and the rib 52 of the filling member 50, and the first and second lead plates 22 and 24 and the PTC element 23 are supported by the filling member 50. With this design, the first and second lead plates 22 and 24 and the PTC element 23 can withstand external pressure or the pressure of the molding resin applied during molding. As a result, deformation of the first and second lead plates 22 and 24 and the PTC element 23 can be prevented. Similar to the filling member 30 according to the exemplary embodiment shown in FIGS. 1 to 4, an adhesive layer can be formed on the inner surface of the filling member 50, which makes it possible for the filling member 50 to firmly support the electrical connection members of the protective circuit module.

The filling member 30 or 50 having a frame shape occupies a gap between the electrical connection members, such as the first and second lead plates 22 and 24 and a lot of curved portions and narrow gaps outside the electrical connection members. Therefore, it is possible to prevent excessive shrinkage of the mold 40 due to the insufficient application of the molding resin to the curved portions and the narrow gaps outside or inside the electrical connection members.

Figure 6:
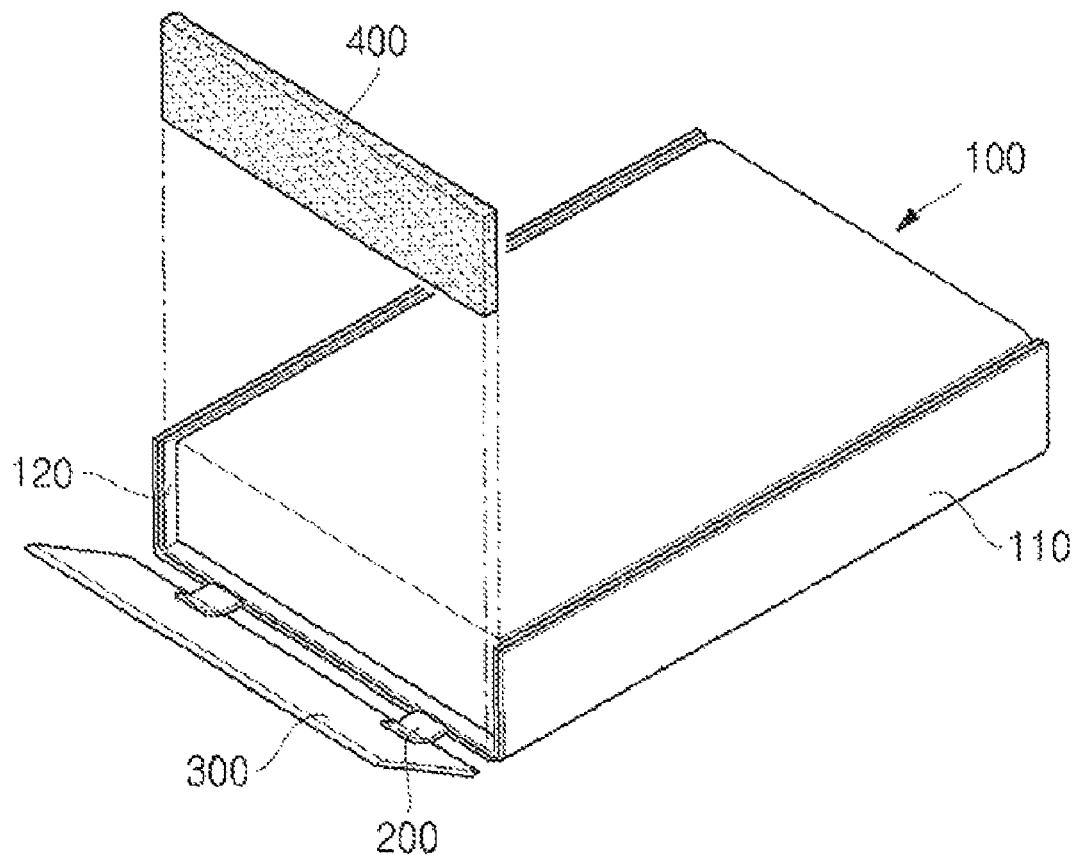
FIG. 6 is an exploded perspective view illustrating a secondary battery according to another exemplary embodiment of the invention before a filling member is coupled to a pouch-type bare cell.
Figure 7:
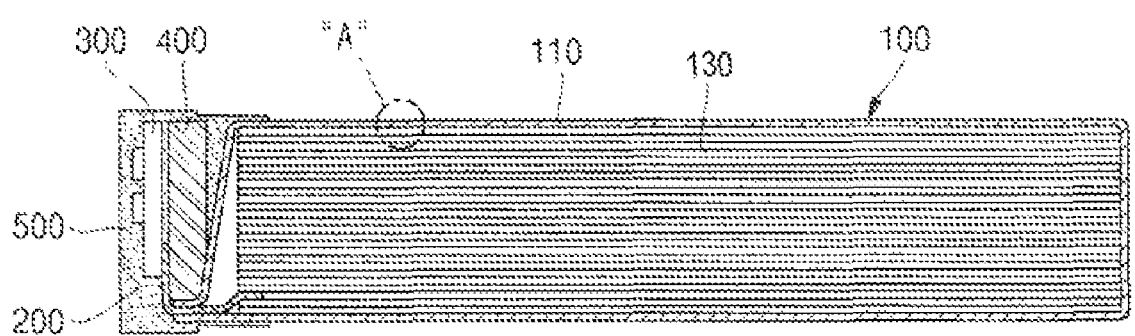
FIG. 7 is a side view illustrating the secondary battery shown in FIG. 6 after molding.
Figure 8:
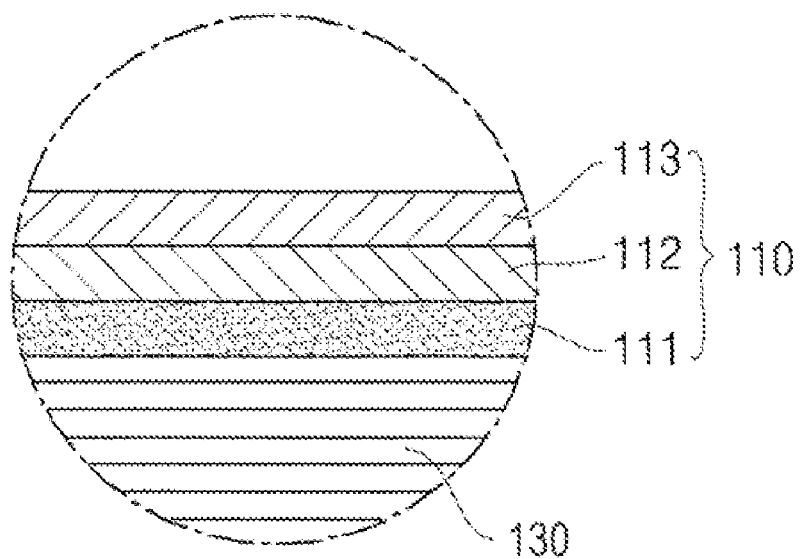
FIG. 8 is an enlarged view of a portion "A" of FIG. 7.

Turning now to FIGS. 6 to 8, FIGS. 6 to 8 show a pouch-type bare cell having the filling member according to the exemplary embodiment applied thereto. As shown in FIGS. 6 to 8, a pouch-type bare cell 100 includes a pouch 110 having an upper pouch film and a lower pouch film and an electrode assembly 130 housed within the pouch 110. Two electrode tabs 200 of the electrode assembly 130 extend from the pouch 110. Portions of the two electrode tabs 200 extending from the pouch 110 serve as insulting portions that insulate the two electrode tabs 200 from the upper and lower pouch films of the pouch 110.

A protective circuit board 300 is electrically connected to the two electrode tabs 200 extending from the pouch-type bare cell 100. The protective circuit board 300 has a protective circuit for the pouch-type bare cell 100 formed thereon. In general, the protective circuit board 300 is formed by mounting various electronic elements on a printed circuit board (PCB).

A filling member 400 is provided between the protective circuit board 300 and one side of the pouch-type bare cell 100 from which the two electrode tabs 200 extend. The filling member 400 occupies most of the molding space between the pouch-type bare cell 100 and the protective circuit board 300. As a result, the molding space between the bare cell 100 and the protective circuit board 300 can be considerably reduced by the presence of the filling member 400, which results in a reduction in the amount of molding resin uniformly injected into the molding space between the pouch-type bare cell 100 and the protective circuit board 300. Therefore, it is possible to reduce the occurrence of defects in the secondary battery due to the non-uniform thickness of a mold 500 caused by the non-uniform application of molding resin into the molding space between the pouch-type bare cell 100 and the protective circuit board 300, and to prevent shrinkage that can occur when the mold 500 is solidified. As a result, the mold 500 having a flat and smooth surface can be formed.

As shown in FIG. 6, the filling member 400 according to this exemplary embodiment can have a plate shape. In this exemplary embodiment, one filling member 400 having a plate shape is provided between the pouch-type bare cell 100 and one surface of the protective circuit board 300, but the invention is not limited thereto. For example, a plurality of filling members having a plate shape can be provided between the pouch-type bare cell and one surface of the protective circuit board 300. In addition, the filling member 400 having a plate shape can be formed such that the area of one surface thereof is equal to or smaller than the area of the cross section of the pouch-type bare cell 100 that is taken along a thickness direction. By doing so, the filling member 400 does not protrude from the surface of the pouch-type bare cell 100.

A terrace 120, corresponding to a sealing region between the upper and lower pouch films, extends from the pouch-type bare cell 100 in the direction in which the electrode tabs 200 extend. The filling member 400 is disposed inside the terrace 120 so as to face the protective circuit board 300. More specifically, the pouch 110, including the upper and lower pouch films, forms an outer case of the pouch-type bare cell 100. Each of the upper and lower pouch films is a laminated structure of a heat adhesive film and a plurality of films that are made out of other materials and are sequentially stacked on the heat adhesive film. For example, portion "A" of FIG. 7 is a portion of the upper pouch film, and the upper pouch film can have a three-layer structure that includes a polyolefin layer 111, an aluminum layer 112, and a nylon layer 113. The polyolefin layer 111 has a heat adhesion property and serves as a sealing material. The aluminum layer 112 maintains the mechanical strength of the pouch and also serves as a barrier layer for preventing the permeation of water and oxygen. The nylon layer 113 serves as a protective layer. Similar to the upper pouch film, the lower pouch film is also a three-layer structure that includes a polyolefin layer, an aluminum layer, and a nylon layer.

The edges of the upper and lower pouch films are sealed by the polyolefin layers, which are the heat adhesive layers, and bending is performed on three sides of the sealed structure of the upper and lower pouch films from which the electrode tabs do not extend. Then, the bent sealing portions are closely adhered to a main body of the pouch-type bare cell. Bending is not performed on one side of the sealed structure of the upper and lower pouch films from which the electrode tabs 200 extend, and the portion that is not bent forms the terrace 120.

The protective circuit board 300 is electrically connected to the electrode tabs 200 extending from the pouch 110 of the pouch-type bare cell 100, and the electrode tabs 200 are bent so that the protective circuit board 300 faces the inner side of the terrace 120 of the pouch 110. The protective circuit board 300 can be arranged outside the terrace 120, or a portion of or the entire side surface of the protective circuit board 300 can be arranged inside the terrace 120. In addition, a molding process using a molding resin is performed to combine the protective circuit board 300 to the pouch-type bare cell 100, with the filling member 400 facing one surface of the protective circuit board 300 inside the terrace 120 of the pouch 110. Since the filling member 400 occupies the inside of the terrace 120 facing the one surface of the protective circuit board 300, a molding space of the pouch-type bare cell 100 can be reduced, allowing various advantages. The advantages of the filling member 400 have previously been described above, and thus a detailed description thereof will be omitted.

Figure 9:
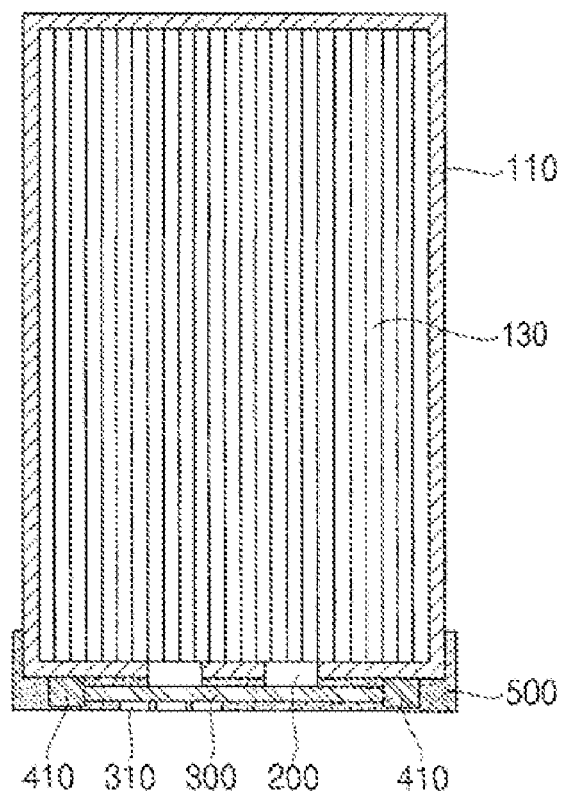
FIG. 9 is a cross-sectional view illustrating a pouch-type bare cell and a filling member coupled thereto according to another exemplary embodiment of the invention.

Turning now to FIG. 9, FIG. 9 is a diagram illustrating another example of the pouch-type bare cell having a filling member applied thereto. As shown in FIG. 9, a pair of filling members 410 are provided between both ends of the protective circuit board 300 and the inner surface of the terrace 120 of the pouch 110 that contains electrode assembly 130. In the design of FIG. 9, a volume corresponding to the two filling members 410 serve to reduce a molding space of the pouch-type bare cell 100. External terminals 310 of the protective circuit board 300 are exposed from mold 500.

As described above, according to the secondary battery according to the above-mentioned exemplary embodiments of the invention, a molding resin can be relatively uniformly applied to a molding space between the bare cell and the protective circuit board to make the thickness of a mold of the secondary battery uniform. As a result, it is possible to reduce the number of defects caused by the non-uniform thickness of the mold and to manufacture a secondary battery with a mold having a flat and smooth surface.

Further, the electrical connection members, such as lead plates, are surrounded by a frame-shaped porous filling member and reside inside the porous filling member, so that the filling member occupies space outside the electrical connection members that prevents molding resin from being applied to the gap between the electrical connection members. As a result, the molding resin can be uniformly and smoothly applied to the molding space, which makes it possible to obtain a mold having a good outward appearance. Furthermore, the pressure of the molding resin applied to the electrical connection members, including the lead plates, during the molding process is considerably reduced. As a result, the protective circuit board is less likely to be deformed by the molding process.

As described above, although the exemplary embodiments of the invention have been described above, the invention is not limited thereto. Therefore, it would be appreciated by those skilled in the art that various modifications and changes of the invention can be made without departing from the scope and spirit of the invention, the scope of which is defined in the appended claims and their equivalents.

What is claimed is:

1. A secondary battery, comprising:
    a bare cell;
    a protective circuit module including a protective circuit arranged on a protective circuit board and a plurality of electrical connection members electrically connecting the protective circuit board to the bare cell;
    a filling member arranged between the bare cell and the protective circuit board, the filling member being comprised of a porous material; and
    a mold covering the electrical connection members and the filling member, the mold comprising a molding resin, a portion of said molding resin of said mold being arranged within said filling member.

2. The secondary battery of claim 1, wherein the bare cell has a square shape that includes four narrow sides continuously connected to one another and two wide surfaces connected to the four narrow sides, and wherein the filling member is coupled to a one of the four narrow sides of the bare cell on which the protective circuit module and an electrode terminal of the bare cell are arranged.

3. The secondary battery of claim 2, wherein the filling member has a frame shape, and the electrical connection members of the protective circuit module are arranged within the frame.

4. The secondary battery of claim 3, wherein the electrical connection members are prevented from being moved by having at least one of the plurality of electrical connection members being in contact with an inner surface of the filling member.

5. The secondary battery of claim 3, further comprising an adhesive layer arranged on an inner surface of the frame-shaped filling member.

6. The secondary battery of claim 1, wherein the plurality of electrical connection members of the protective circuit module comprise:
    a first lead plate electrically connected to an electrode terminal of the bare cell while being electrically insulated from a side of the bare cell on which the electrode terminal is arranged;
    a second lead plate electrically connected to a surface of the bare cell that has an opposite polarity to that of the electrode terminal by being arranged on a side of the bare cell on which the electrode terminal is arranged and at a position opposite to the first lead plate;
    a first connection terminal connected to the first lead plate by being arranged on the protective circuit board; and
    a second connection terminal connected to the second lead plate by being arranged on the protective circuit board.

7. The secondary battery of claim 6, wherein the first lead plate comprises a first conductor and a second conductor, the first conductor being electrically connected to the electrode terminal of the bare cell, and the first and second conductors being electrically connected to each other, the secondary battery further comprising a positive temperature coefficient (PTC) element arranged between the first conductor and the second conductor.

8. The secondary battery of claim 1, said mold comprising a molding resin that contacts and permeates the filling member.

9. The secondary battery of claim 1, said mold comprising a molding resin, a portion of said molding resin of said mold being arranged within pores of said filling member.

10. The secondary battery of claim 1, the mold being produced by an injection molding process, the mold being comprised of a molding resin, the filling member absorbing a portion of said molding resin during said injection molding process.

11. The secondary battery of claim 6, the filling member comprises:
   a main frame that surrounds the electrical connection members; and
   a rib arranged inside the main frame and occupying a gap between the electrode terminal and the second lead plate.

12. The secondary battery of claim 11, wherein circumferential surfaces of the first and second lead plates are in contact with the main frame.

13. A secondary battery, comprising:
   a bare cell;
   protective circuit module including a protective circuit arranged on a protective circuit board and a plurality of electrical connection members electrically connecting the protective circuit board to the bare cell;
   a filling member arranged between the bare cell and the protective circuit board, the filling member being comprised of a porous material; and
   a mold covering the electrical connection members and the filling member, wherein the porous material is polyurethane.

14. A secondary battery, comprising:
   a bare cell;
   a protective circuit module including a protective circuit arranged on a protective circuit board and a plurality of electrical connection members electrically connecting the protective circuit board to the bare cell;
   a filling member arranged between the bare cell and the protective circuit board, the filling member being comprised of a porous material; and
   a mold covering the electrical connection members and the filling member, wherein the bare cell includes a pouch and positive and negative electrode tabs of an electrode assembly arranged within the pouch and extending from the pouch, the protective circuit board being connected to ends of the positive and negative electrode tabs extending from the pouch, the filling member being arranged in a space between one surface of the protective circuit board and the pouch.

15. The secondary battery of claim 14, wherein the filling member has a plate shape and has an area equal to or smaller than an area of a cross section of the bare cell taken along a thickness direction.

16. The secondary battery of claim 14, wherein the pouch includes an upper pouch film and a lower pouch film, surfaces of the upper and lower pouch films opposite to each other including heat adhesive layers, edges of the upper and lower pouch films being sealed by the heat adhesive layers, wherein a sealing region that is arranged in a direction in which the electrode tabs extend forms a terrace, the terrace not being bent in the thickness direction of the bare cell, the filling member being arranged inside the terrace.

17. The secondary battery of claim 16, wherein the protective circuit board is arranged inside the terrace, the filling member being arranged between both ends of the protective circuit board and an inner surface of the terrace.

18. The secondary battery of claim 16, wherein the filling member is a plate having both ends in contact with inner surfaces of the terrace.

19. The secondary battery of claim 16, wherein each of the upper and lower pouch films comprises
   a polyolefin heat adhesive layer including a sealing material;
   an aluminum layer to maintain a mechanical strength of the pouch and to prevent permeation of water and oxygen; and
   a protective nylon layer.

* * * * *